Jan. 15, 1952   J. L. MERRILL, JR   2,582,498
NEGATIVE IMPEDANCE REPEATER AND LOADING SYSTEM
Filed Aug. 30, 1949   7 Sheets-Sheet 1

INVENTOR
J. L. MERRILL, JR.
BY:
ATTORNEY

Jan. 15, 1952      J. L. MERRILL, JR      2,582,498
NEGATIVE IMPEDANCE REPEATER AND LOADING SYSTEM
Filed Aug. 30, 1949      7 Sheets-Sheet 2

INVENTOR
J. L. MERRILL, JR.
BY
B. L. Leger
ATTORNEY

Jan. 15, 1952  J. L. MERRILL, JR  2,582,498
NEGATIVE IMPEDANCE REPEATER AND LOADING SYSTEM
Filed Aug. 30, 1949  7 Sheets-Sheet 3
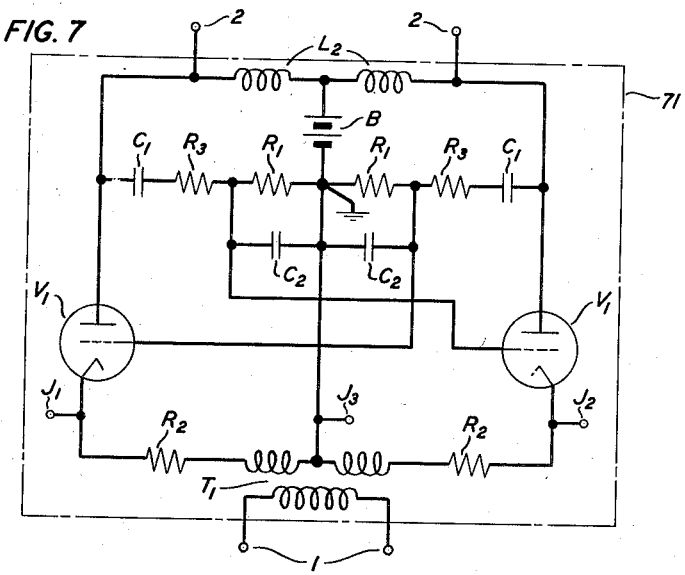
FIG. 7
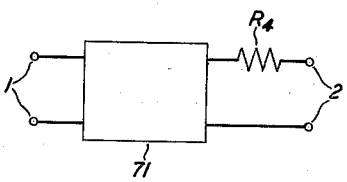
FIG. 7A
FIG. 8
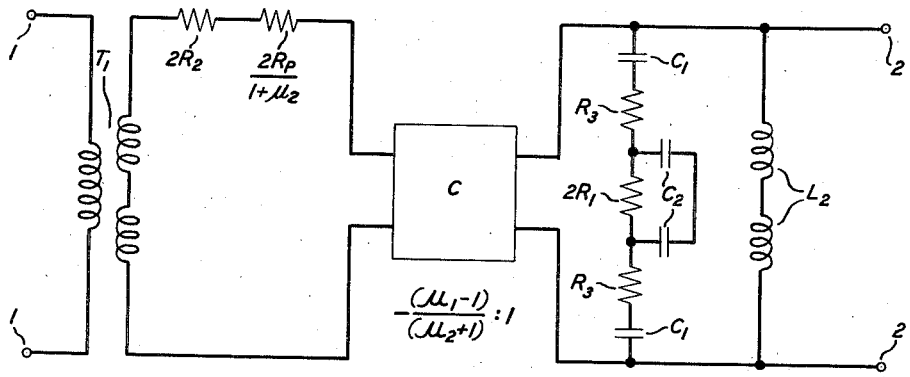
INVENTOR
J. L. MERRILL, JR.
BY:
*B. C. [signature]*
ATTORNEY Jan. 15, 1952  J. L. MERRILL, JR  2,582,498
NEGATIVE IMPEDANCE REPEATER AND LOADING SYSTEM
Filed Aug. 30, 1949  7 Sheets-Sheet 4

INVENTOR
J. L. MERRILL, JR.
BY:
B. C. Feger
ATTORNEY

Jan. 15, 1952   J. L. MERRILL, JR   2,582,498
NEGATIVE IMPEDANCE REPEATER AND LOADING SYSTEM
Filed Aug. 30, 1949   7 Sheets-Sheet 5

INVENTOR
J. L. MERRILL, JR
BY
B. C. Feger
ATTORNEY

Jan. 15, 1952   J. L. MERRILL, JR   2,582,498
NEGATIVE IMPEDANCE REPEATER AND LOADING SYSTEM
Filed Aug. 30, 1949   7 Sheets-Sheet 6

INVENTOR
J.L. MERRILL, JR.
BY:
B. E. Leger
ATTORNEY

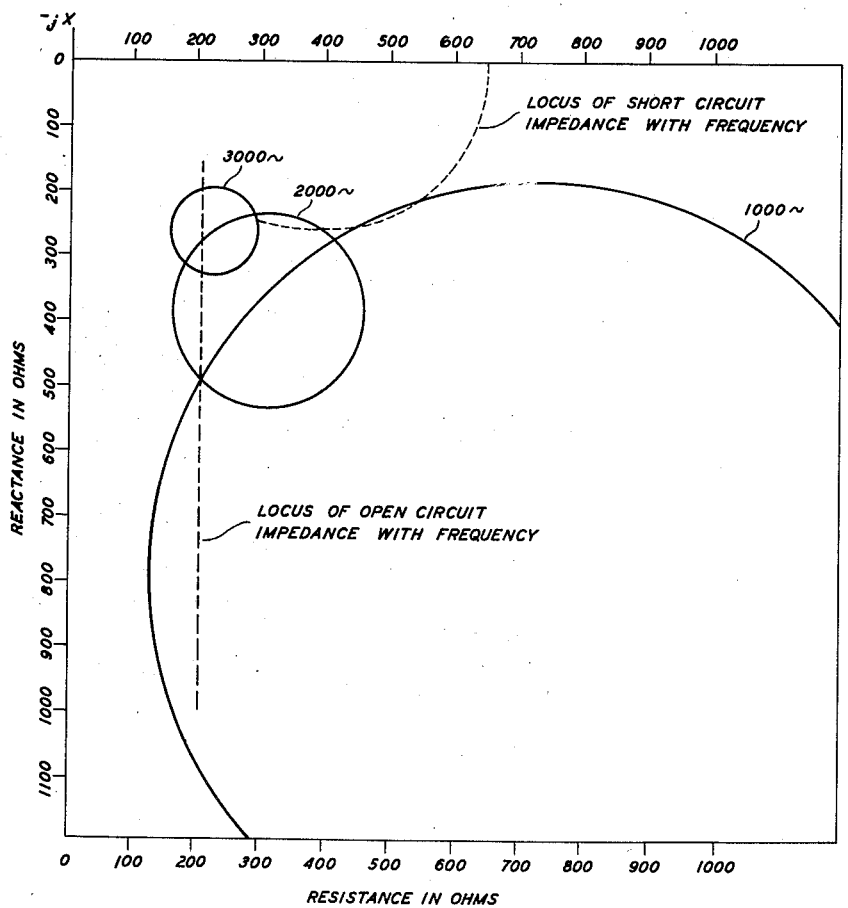

Patented Jan. 15, 1952

2,582,498

UNITED STATES PATENT OFFICE 2,582,498

NEGATIVE IMPEDANCE REPEATER AND LOADING SYSTEM

Josiah L. Merrill, Jr., Port Washington, N. Y., assignor to Bell Telephone Laboratories, Incorporated, New York, N. Y., a corporation of New York Application August 30, 1949, Serial No. 113,072

17 Claims. (Cl. 178—45)

This invention relates to negative impedance circuits such as, for example, negative impedance converters, negative impedance repeaters and circuits incorporating them, and transmission lines loaded with negative impedances.

Objects of the invention are production of stable negative impedance, and reduction of attenuation or distortion in transmission lines.

It is also an object of the invention to provide a stable transmission system comprising a vacuum tube type of negative impedance repeater connected in series between two inductively loaded lines or in series between an inductively loaded line and a non-loaded line.

A further object is to provide stable negative impedance loading systems.

In one aspect the invention is a specific form of vacuum tube negative impedance converter, i. e., vacuum tube circuit for converting positive impedance into negative impedance. The practical (i. e., real or actual) converter is reducible to an electrically equivalent four-terminal circuit consisting of positive impedance elements together with a device that may be referred to as an ideal negative impedance converter. The ideal negative impedance converter is a four-terminal network or device that has an impedance transformation ratio of $-k:1$, $k$ being a quantity that is a numeric at a prescribed frequency and approximately a numeric over a finite frequency range which includes the prescribed frequency, but that at frequencies below and above this range is a complex quantity which can have an appreciable phase angle. In the first-mentioned equivalent circuit, some of the positive impedance elements appear as a network on one side of the ideal converter; the remainder appear as a network on the other side of the ideal converter. These two networks tend to make the ratio of impedance transformation for the practical converter's equivalent circuit depart from the ratio for the ideal converter.

In accordance with a feature of the invention, the practical converter can be so constructed that, except with regard to power dissipation, the two networks in its equivalent circuit substantially balance each other in effect over the frequency range of interest. Thus, only the effect of the ideal converter remains and the practical converter can be represented by the ideal converter.

In accordance with a feature of the invention, to facilitate obtaining this balance or to reduce the effect of unbalance of the two networks, the impedance of series arms of the networks may be made relatively low and the impedance of shut arms relatively high.

In accordance with a feature of the invention, the converter is constructed to develop a negative impedance over a prescribed frequency range and positive impedance outside this frequency range. Such impedance control is desirable for a number of reasons. For example, at extremely high or low frequencies the positive impedance elements of the converter determine the impedance seen at its terminals. For many practical purposes, it is not only necessary to have the impedance seen at the terminals negative over a prescribed range of frequencies, which is the range of primary interest, but it is also necessary to have the impedance seen at the terminals positive at frequencies outside this band. A positive impedance at high and low frequencies may be desired for two reasons: first, to insure stability against oscillation, and second, to attenuate or pass other signals at frequencies where gain may not be wanted. For example, in a telephone line gain may be required for the voice band of frequencies, but not wanted at the lower frequencies of ringing, dialing and the like. The reason for this is that the power handling capacity required of a negative impedance converter to increase ringing and dialing currents would have to be much greater than that required to provide gain for speech currents only. Ringing generators or dial pulse repeaters might prove more economical for supplying power at these lower frequencies.

One specific form of negative impedance converter embraced by the invention is an electric space discharge amplifier comprising a negative feedback impedance common to the cathode-anode and cathode-grid circuits and adapted to serve as an input coupling circuit and output coupling circuit for the amplifier, an anode circuit load impedance in serial relation with the feedback impedance in the cathode-anode circuit, and means for producing in the amplifier positive feedback that renders the amplifier input impedance negative over a prescribed frequency range, the means for producing positive feedback comprising a positive feedback path whose input voltage depends upon and is derived from the anode circuit load impedance. The negative feedback reduces the amplifier input impedance to a low value and the positive feedback further reduces it, rendering it negative over the prescribed frequency range. The anode circuit load impedance includes an impedance network for controlling the magnitude and phase of the amplifier input impedance, in order, for example, to give gain control and attenuation equalization when the converter is connected as a repeater in series in a telephone transmission line. The repeater, while of general utility, is particularly suitable for use in exchange area circuits of telephone systems, where gain with stability against oscillation is difficult to obtain because the impedances encountered by repeatered lines vary widely as a result of the great variety of facilities to be interconnected or switched.

In one specific aspect the invention is a transmission line loaded with uniformly spaced negative impedances which render the mid-section characteristic impedance of the line a substantially non-reactive resistance over a prescribed frequency range, the loaded line having relatively low attenuation and being stable for all positive impedance terminations.

In another aspect the invention is a transmission line divided into sections of equal or unequal lengths having a negative impedance inserted in series in the middle of each section, the value of each of the negative impedances being such that the line is stable for all positive impedance terminations and the characteristic impedance is the same at the end of each section over a prescribed frequency range.

Other objects, aspects and features of the invention will be apparent from the following description and claims.

Figs. 7 and 8 show the circuit schematic and equivalent circuit of another practical negative impedance converter, and Fig. 7A shows a modification of the circuit of Fig. 7;

Figs. 19 and 20 show respectively the circuit schematic of a transmission line loaded with negative impedance and the single-frequency impedance map of such a line;

Fig. 22 shows stability circles at various frequencies for a non-loaded cable.

Figure 1:
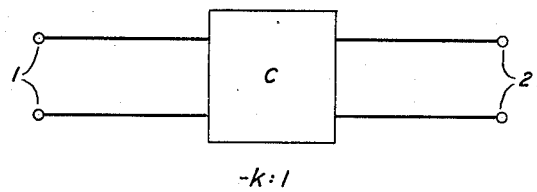
Fig. 1 shows a basic or ideal negative impedance converter.
Figure 2:
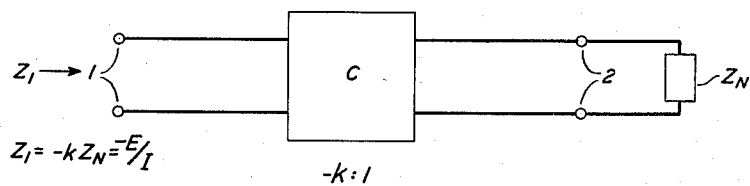
Fig. 2 shows the impedance seen at terminals 1 of the ideal converter.
Figure 3:
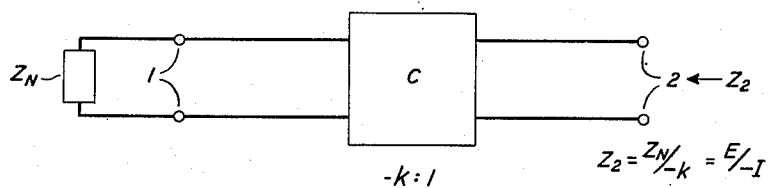
Fig. 3 shows the impedance seen at terminals 2 of the ideal converter.

Fig. 1 presents an ideal negative impedance converter C. It is a form of transformer but has a negative ratio of impedance transformation or conversion designated $-k:1$, as shown. Like a transformer, the converter C can have four terminals. It is capable of bilateral transmission. As shown in Fig. 2, if a positive impedance $Z_N$ is connected to terminals 2, $-kZ_N$ is seen at terminals 1. As shown in Fig. 3, if a positive impedance $Z_N$ is connected to terminals 1, $Z_N/-k$ is seen at terminals 2. As noted by G. Crisson (Negative Impedance and the Twin 21-Type Repeater—B. S. T. J.—July 1931) there are two types of negative impedance, the series type and the shunt type. It is desired to point out the fact that if impedance is defined as $Z=E/I$ then negative impedance can be either Z multiplied by $-1$ (i. e., $-Z=-E/I$) or Z divided by $-1$ (i. e., $-Z=E/-I$). The negative impedance seen at terminals 1, Fig. 2, is the series or reversed voltage type, $-E/I$. The negative impedance seen at terminals 2, Fig. 3, is the shunt or reversed current type, $E/-I$.

Figure 4:
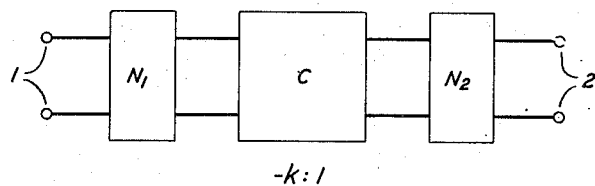
Fig. 4 shows the equivalent circuit of a practical converter.

Any practical (i. e., real or actual) vacuum tube converter contains positive impedance elements in its equivalent circuit along with the ideal converter. This is illustrated by Fig. 4, which shows the equivalent circuit of a practical converter. Some of these positive impedance elements appear as a network $N_1$ on the left-hand side of the ideal converter; the others appear as a network $N_2$ on the right-hand side. Ordinarily these networks $N_1$ and $N_2$ are such that they tend to make the ratio of transformation for the practical converter's equivalent circuit depart from the ratio for the ideal converter. If networks $N_1$ and $N_2$, when viewed from the converter C, had the same configuration and had the impedance of each element in $N_1$ equal $k$ times the impedance of the correspondingly located element in $N_2$, then (except with regard to power dissipation) these networks $N_1$ and $N_2$ would balance each other in effect, thus canceling out, so only the effect of the ideal converter would remain and Fig. 4 could be represented by Fig. 1; or in other words, then the practical converter would be such that in its equivalent circuit each of the networks $N_1$ and $N_2$ as seen from the other (through the ideal converter) would neutralize the effect of the other (upon the transformation ratio of the equivalent circuit of the practical converter), and so the impedance transformation ratio for the practical converter would be the same as for the ideal converter. As can be seen from Figs. 5 and 6, described below, difficulty might be encountered were it attempted to make the practical converter such that $N_1$ and $N_2$ in its equivalent circuit would, when viewed from C, have like configuration and have the impedance of each element in $N_1$ equal $k$ times the impedance of the correspondingly located element in $N_2$ (for example, were it attempted to add to each network the elements required for giving it the same configuration as the other network when the two networks are viewed from C, and then assign each element in $N_1$ an impedance value equal to $k$ times that of the correspondingly located element in $N_2$). However, in accordance with a hereinafter described feature of the invention, the practical converter can be readily made such that, in its equivalent circuit, over the frequency range of interest $N_1$ and $N_2$ mutually substantially cancel or neutralize their effects on the transformation ratio. This can be accomplished by constructing the practical converter so that in the networks $N_1$ and $N_2$ of its equivalent circuit the following conditions obtain over the frequency range of interest; (1) certain of the series and shunt elements have their impedances low and high, respectively, compared to each of the two impedances between which the converter is to be connected, so the effects of those series and shunt elements on the impedance transformation ratio of the equivalent circuit of the practical converter are negligibly low, and (2) the remaining elements (of the networks $N_1$ and $N_2$) have their impedances and their positions in the network configurations such that the remaining elements in each network substantially cancel or neutralize the effect of the remaining elements in the other network upon the over-all transformation ratio of the equivalent circuit of the practical converter.

Figure 5:
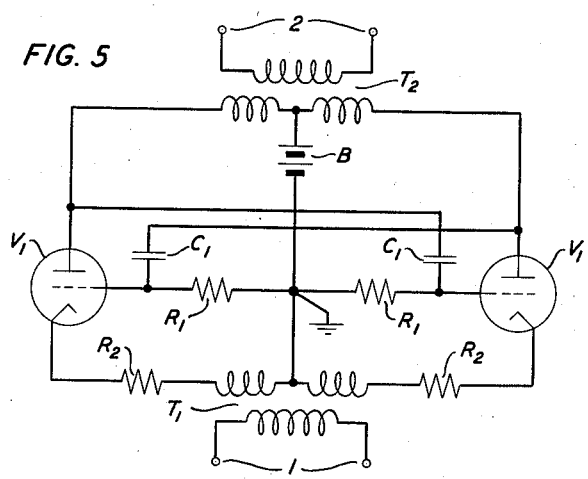
Figs. 5 and 6 show the circuit schematic and equivalent circuit respectively, of a practical negative impedance converter.

Fig. 5 shows the circuit schematic of a practical negative impedance converter embodying one specific aspect of the invention. It comprises: two transformers designated $T_1$ and $T_2$; two identical vacuum tubes or electric space discharge devices preferably normally biased for class A operation, each designated $V_1$; two similar capacitors designated $C_1$, each capacitor coupling the plate of one tube to the grid of the other, for producing positive feedback; two similar resistors $R_1$, respectively connecting the grids of the tubes to the negative terminal of the battery B; and two resistors $R_2$, one in each cathode circuit, for grid bias. The negative pole of the battery B is shown grounded. The devices $V_1$ are in push-pull relation. One winding of transformer $T_1$ is connected in series with the resistors $R_2$ between the cathodes and has its mid-point grounded. The resistors $R_2$ and the two halves of this winding produce negative feedback and produce direct-current voltage drops for biasing the grids of the two tubes equally. The direct-current resistance of one of the halves of the winding may exceed that of the other half by a given amount, and then the resistance of the element $R_2$ adjacent that other half may exceed by the same amount the resistance of the other element $R_2$. The devices $V_1$ may be, for example, twin triodes of a Western Electric type 407A vacuum tube, which has the amplification constant $\mu$ of each triode equal to approximately 30.

While the discharge devices shown in Fig. 5 (and those shown in Fig. 7 which is described hereinafter) have but one grid, the term triode in the specification and claims in generic to multigrid discharge devices, for example tetrodes and pentodes which include a cathode, an anode and a grid or space discharge control element.

Figure 5A:
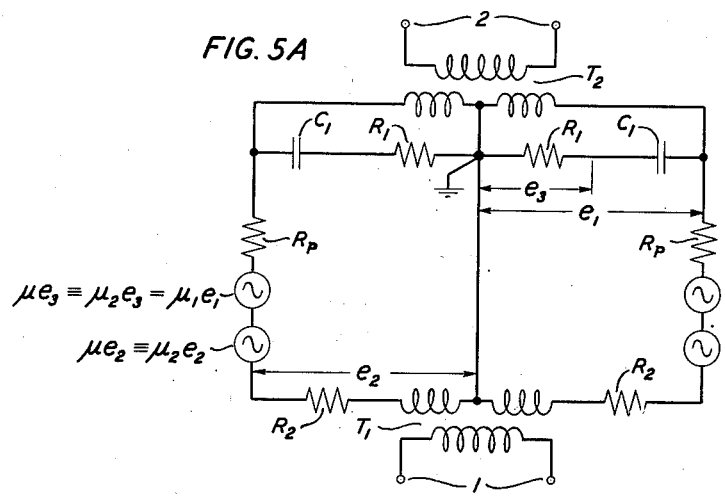
Fig. 5A shows the circuit of Fig. 5 with its triodes represented by their equivalent circuits.

Let $\mu_1$ represent the amplification from the plate-to-ground voltage of either vacuum tube to the resulting component of the internal plate-cathode generator voltage in the other tube, and let $\mu_2$ represent the amplification from the cathode-to-ground voltage of either tube to the resulting component of the internal plate-cathode generator voltage in the tube. Thus, $\mu_2$ is the factor by which the voltage between cathode of either tube and ground (or the negative pole of the battery B) must be multiplied in order to obtain the value of the resulting component of internal plate generator voltage in the tube (or in other words, $\mu_2$ is the tube amplification constant, usually designated $\mu$); and $\mu_1$ is the quantity by which the voltage between the plate of either tube and ground (or the negative pole of the battery B) must be multiplied in order to obtain the component of internal plate generator voltage of the other tube that results from the voltage drop between its grid and ground. The amplification factor $\mu_1$ is equal to $\beta\mu_2$ where $\beta$ designates the ratio of the voltage between ground and the grid of either tube to the voltage between ground and the plate of the other tube. Representing the triodes by their equivalent circuits in conventional manner, the circuit of Fig. 5 can be reduced to that of Fig. 5A. In Fig. 5A, the voltage between ground and the cathode of one tube is designated $e_2$, the voltage between ground and the plate of the other tube is designated $e_1$, and the voltage across the resistor $R_1$ in the plate circuit of that other tube is designated $e_3$. The plate generator in the one tube is indicated as two generators in series, one being designated by its voltage $\mu e_2$ and the other being designated by its voltage $\mu e_3$, the total plate generator voltage in this tube being $\mu e_2 + \mu e_3$. It is seen that $$\mu_2 e_3 = (\mu_2)\left(\frac{e_3}{e_1}\right) e_1 = \mu_2 \beta e_1 = \mu_1 e_1$$

In the specific circuit of Fig. 5, $$\beta = \frac{e_3}{e_1} = \frac{R_1}{R_1 + \frac{1}{\omega C_1}}$$

where $\omega$ designates the angular velocity in radians. Thus, $\mu_1$, the amplification of the voltage in the plate circuit, depends upon the relative values of $C_1$ and $R_1$ as well as on $\mu$, the tube amplification constant.

Figure 6:
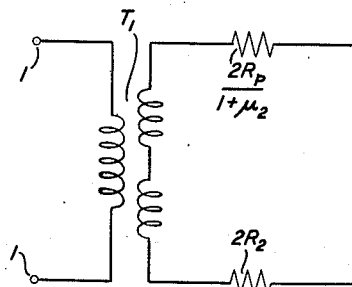
Figure 6:
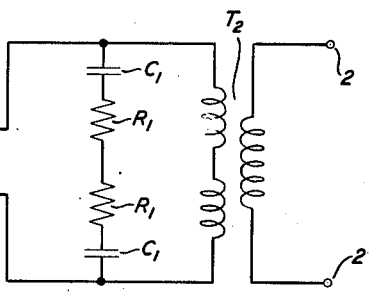

Fig. 6 shows the equivalent circuit of Fig. 5 as derived by application of circuit theory to Fig. 5A. Fig. 6 comprises the transformers, capacitors and resistors mentioned above plus an ideal negative impedance converter C having a ratio of transformation of $-(\mu_1-1)/(\mu_2+1):1$. In addition, the internal plate resistance of the tubes appears as an impedance in series with transformer $T_1$, this impedance being shown as a resistance of value $2Rp/(1+\mu_2)$, the value of the plate resistance in each tube being taken at $Rp$. If $\mu_1$ approximates $\mu_2$ and each is much greater than unity, $k$ approximates unity. If $k=1$ and $2Rp/(1+\mu_2)$ is of small order of magnitude relative to the impedance that it faces (i. e., relative to the sum of all impedances effectively in series with it), then the action of the converter, to a first approximation at least, is independent of minor variations in tube constants and battery supply voltage. Making $\mu_2$ large and $Rp$ small tends to reduce the impedance of the element identified in the drawing as $2Rp/(1+\mu_2)$ and thus render its effect on the negative impedance presented by the converter unimportant. In the circuit of Fig. 6, all elements on the left-hand side of the ideal converter C may be designated as a network $N_1$ and all elements on the right-hand side of the ideal converter C may be designated as a network $N_2$, after the fashion of Fig. 4. As indicated above, it is apparent that difficulty would be encountered were attempt made to so construct the circuit of Fig. 5 that in its equivalent circuit shown in Fig. 6, $N_1$ and $N_2$ when viewed from C would have the same configuration and have the impedance of each element in $N_1$ equal $k$ times the impedance of the correspondingly located element in $N_2$.

However, if all series elements in the circuit of Fig. 6 can be made relatively small in impedance and all shunt elements relatively large the circuit will approach that of the ideal converter. In other words, the operation or effect of the circuit approaches that of the ideal converter provided that, when the transformers $T_1$ and $T_2$ are replaced by their usual equivalent networks, all impedances (of elements of networks $N_1$ and $N_2$) effectively in series in the conduit with respect to transmission between terminals 1 and 2 are much smaller than each of the two impedances to be attached to terminals 1 and 2, and all impedances effectively in shunt across the circuit with respect to transmission between terminals 1 and 2 are much greater than each of the just-mentioned two impedances. At high frequencies a practical difficulty arises. The windings of transformers $T_1$ and $T_2$ have distributed capacity and leakage inductance. At some frequency this capacity and inductance will resonate. If this frequency is not identically the same for $T_1$ and $T_2$, the circuit may be unstable and oscillate as explained below.

A converter of the type described herein is essentially a feedback amplifier and as such must meet Nyquist's rule for stability (given in the article by H. Nyquist on Regeneration Theory, B. S. T. J., January 1932). However, with reference to the ideal converter there is a similar rule which can be applied in order to determine unconditional stability. Referring to the ideal converter of Fig. 2, assume a line or other circuit of impedance $Z_L$ (not shown in Fig. 2) is connected to terminals 1. Then if $kZ_N$ were equal to $Z_L$ it is evident that the impedance of the circuit mesh consisting of $Z_L - kZ_N$ would be zero and oscillation or singing would occur. Thus it becomes evident that $kZ_N$ should not equal $Z_L$; or, what is the same thing, the ratio $kZ_N/Z_L$ should not equal $$1/0$$

if the system is to be stable. Furthermore, it can be shown that for an ideal converter the ratio $kZ_N/Z_L$ is the feedback factor ($\mu\beta$ as defined on page 32 of H. W. Bode's book on network analysis and feedback amplifier design, published by D. Van Nostrand Company, New York), of the amplifier in the converter. In view of this fact, Nyquist's rule for stability in feedback amplifiers can be paraphrased as follows: for stability to obtain in an ideal negative impedance converter the locus of the ratio $kZ_N/Z_L$ over the frequency range from zero to infinity must not enclose the point $$1/0$$

From a practical engineering viewpoint there is a criterion for judging stability which is often more useful than the general rule. It can be stated as follows: The ideal negative impedance converter will be unconditionally stable providing that the magnitude of $kZ_N/Z_L$ is less than unity at any frequency where the angle of this ratio is zero.

In a practical converter, as shown in Fig. 4, 5 or 6, the same rule for stability holds except $Z_L$ is to be taken as the impedance seen looking toward network $N_1$ from the ideal converter C and $Z_N$ is to be taken as the impedance seen looking toward network $N_2$ from the ideal converter C. If the elements in $N_2$ are all made equal to or less than $1/k$ times corresponding elements in $N_1$ in impedance at all frequencies then these two networks can be omitted from stability considerations for many practical purposes. Otherwise, the effect of $N_1$ must be included in $Z_L$ and the effect of $N_2$ must be included in $Z_N$, in applying the stability rule. If at any frequency a resonant condition then exists whereby the impedance $Z_N$ goes to a high value there will be the possibility of $kZ_N$ being greater than $Z_L$. If when this condition occurs the angle of the ratio $kZ_N/Z_L$ is zero the circuit may oscillate. Therefore, it is desirable to prevent such resonance from occurring in the network $N_2$ of Fig. 4.

One way of accomplishing this is illustrated in Figs. 7 and 8. The Fig. 7 is similar to Fig. 5 except that a retard coil or inductance coil $L_2$ has been substituted for transformer $T_2$, resistor $R_3$ has been inserted in series with capacitor $C_1$, and capacitor $C_2$ has been shunted across $R_1$. The network $C_1$, $R_3$ and $R_1$ largely determines the value of $\mu_1$ at low frequencies. The network $R_3$, $R_1$ and $C_2$ largely determines the value of $\mu_1$ at high frequencies. (As in the case of Fig. 5, $\mu_2=\mu$, and $\mu_1$ is the amplification from the plate-to-ground voltage of either triode to the resulting component of the internal plate-cathode generator voltage in the other triode.) The equivalent circuit of Fig. 7 has been derived by application of circuit theory and is shown in Fig. 8. On the right-hand side of the ideal converter C all reactance elements are in shunt paths across the terminals 2. An antiresonance can occur but in any such case the impedance on the right-hand side of the ideal impedance converter will be determined primarily by the network attached to terminals 2. It is an important feature of Fig. 7 that in its equivalent circuit shown as Fig. 8, in the circuit between the ideal converter C and the terminals 2 there is no impedance effectively in series that might, by resonating with capacitance effectively in shunt across the circuit, cause the impedance on the right-hand side of C to be greater than that on the left-hand side and thereby create possibility of instability or singing. In Fig. 6, in contrast, leakage inductance of transformer $T_2$, effectively in series in the circuit between the ideal converter C and the terminals 2, might resonate at a high frequency with shunt capacitance (distributed capacitance of windings of $T_2$) and thus form an antiresonant circuit (including $Z_N$) across the right-hand terminals of converter C, and thereby cause the impedance on the right-hand side of converter C to exceed $1/k$ times that on the left-hand side (and so create a potential singing condition that would require careful consideration in the design of the converter and its associated circuits).

In Fig. 8, as in Fig. 6, the ratio of transformation $-k$ equals $-(\mu_1-1)/(\mu_2+1)$, where $\mu_1$ depends upon the values of the impedances in the RC circuit coupling the grids and plates of the vacuum tubes (as well as upon the amplification factor of the tubes themselves). At high and low frequencies, $\mu_1$ is not a numeric but is a complex quantity whose angle and magnitude are determined at these frequencies largely by the values of the just-mentioned impedances. In the operating frequency range, if these impedance values are adjusted so $\mu_1$ approximates $\mu_2$ and each is much greater than unity, $k$ approximates unity. If, over a definite frequency band, all shunt elements in Fig. 8 are made relatively large and all series elements relatively small in value as referred to above in connection with Fig. 6, and, furthermore, $k=1$, then the circuit of Fig. 8 (and correspondingly the circuit of Fig. 7) approximates in operation on this frequency band an ideal converter having a ratio of transformation of $-1$ times the ratio of the impedance of the line winding of transformer $T_1$ facing terminals 1 to the impedance of the other winding of transformer $T_1$. If $k$ is close to unity and the impedance $Rp/(1+\mu_2)$ is of small order of magnitude relative to the impedance that it faces, then battery supply variations and tube changes will have little effect upon the negative impedance presented by the converter. (As indicated above in connection with Fig. 6, making $\mu_2$ large and $Rp$ small, for example by appropriate choice of tube type and operating voltages, tends to render $2Rp/(1+\mu_2)$ negligibly small.)

Negative resistance can be obtained only over a finite range of frequencies. For example, when a resistance (not shown) is connected to terminals 2 of Fig. 8, the impedance seen looking into terminals 1 resembles the locus shown on the polar diagram of Fig. 9. Between a frequency $f_2$ and a higher frequency $f_3$, there is seen at terminals 1 an impedance which approximates a negative resistance, and at some frequencies between $f_2$ and $f_3$ a pure negative resistance is found. At zero frequency the impedance seen is a small positive resistance equal to the direct-current resistance of the primary winding of transformer $T_1$. At a low frequency $f_1$ the locus shows a positive impedance. The admittance corresponding to this portion of the impedance locus can be used, for example when terminals 1 are in series in a telephone transmission line, for the passage of low frequency currents for ringing, dialing, and the like. At high frequencies $f_4$ the impedance locus approaches the origin, the impedance approaching zero through capacitive reactance. At high frequencies above the band passed by the telephone line, ordinarily it is desirable that the impedance be positive because gain at those high frequencies is not useful and may be detrimental in adding to the difficulty of obtaining stable operation. As explained hereinafter, when terminals 1 are used in series with a voice frequency transmission line, the impedance most suitable for use across terminals 2 ordinarily will not be a pure resistance but will be a network presenting a complex impedance.

Between frequencies such as $f_2$ and $f_3$ the network across terminals 2 most accurately controls the negative impedance. Therefore, the main transmission band where negative impedance is desired, ordinarily will have its center between two such frequencies and preferably lie between them. For example, in the case of a converter employed in a voice frequency negative impedance repeater, the frequencies on its impedance locus that corresponds to $f_2$ and $f_3$ may be 300 cycles per second and 4,000 cycles per second, respectively, and the phase angle of the negative impedance at each of these two frequencies may differ from 180 degrees by some five or ten degrees. Of course, gain can be had over a band wider than from 300 to 4,000 cycles per second if desired.

In one specific practical design of converter circuit of the type of Fig. 7, over the voice band of frequencies $\mu_1$ is approximately equal to $\mu_2$, and because $\mu_1$ and $\mu_2$ are large compared to unity the ratio of transformation of the converter $$-\frac{\mu_1-1}{\mu_2+1}:1$$

equals about $-0.9:1$ at voice frequencies. The devices $V_1$ are twin triodes of a Western Electric type 407A vacuum tube for which $\mu$ is approximately 30. The impedance ratio of the line transformer $T_1$ is 1:9 step up from the line winding to the winding conductively connected to the cathodes. In the equivalent circuit of the converter, the shunt arms of the equivalent networks on each side of the ideal converter are high impedances at voice frequencies and can be neglected. To cancel the effect of the series resistances on the left-hand side of the ideal converter in this circuit, a series resistance $1/k$ times as great (in this case about 2,000 ohms) is needed on the right-hand side of the ideal converter. In the practical circuit this resistance is added as shown at $R_4$ in Fig. 7A, wherein block 71 is the same circuit as block 71 in Fig. 7. Thus, in Fig. 7A, if a network $Z_N$ of impedance value $Z_N$ be connected across terminals 2, for example as indicated in Fig. 2 or in Figs. 10, 15 or 17 described hereinafter, then at voice frequencies the impedance at terminals 1 viewed from the line equals approximately $-0.1Z_N$. By inserting a resistance $R_4$ such as that of Fig. 7 in the circuit of Fig. 8, as a series element of the circuit, for example between the upper terminal 2 and the junction $C_1$ and $L_2$, the circuit of Fig. 8 is so modified as to become equivalent to the circuit of Fig. 7A, and in such equivalent circuit the resistance $R_4$ will be a part of the network $N_2$, the network between the ideal converter C and the terminals 2. In such equivalent circuit, the network $N_2$ is adapted to neutralize over a prescribed frequency range (the speech frequency range or the frequency range of interest) the effect of the network $N_1$ on the over-all transformation of the equivalent circuit of the converter. In such equivalent circuit the networks $N_1$ and $N_2$ have series and shunt impedance elements (transformer $T_1$ may be replaced by its usual equivalent T network), certain of the series and shunt elements having their impedances low and high, respectively, compared to each of the two impedances between which the converter is to be connected (i. e., the impedance to be connected across terminals 1 and that to be connected across terminals 2), and the remaining impedance elements in the two networks $N_1$ and $N_2$ having their impedances such that the remaining elements in each network are adapted substantially to neutralize the effect of the remaining elements in the other network upon the over-all transformation ratio of the equivalent circuit of the practical converter of Fig. 7A (for example, the remaining element $R_4$ in network $N_2$ is equal to $1/k$ times the sum of the resistance $2R_2$, the resistance $$\frac{2Rp}{1+\mu_2}$$

and the resistances in the series arms of the equivalent T network of the transformer $T_1$). In this equivalent circuit for the converter of Fig. 7A, over the speech frequency range each shunt arm of the networks $N_1$ and $N_2$ (including the shunt arm or item of the equivalent T network of the transformer $T_1$, the shunt arm comprising condensers $C_1$, condensers $C_2$, resistance $2R_1$ and resistances $R_3$ and the shunt arm $L_2$) is of high impedance compared to each of the two impedances between which the converter is to be connected, and the impedance of the series arms of the network $N_1$ equals $k$ times the impedance of the series arms of the network $N_2$, or in other words, $R_4$ equals $1/k$ times the sum of $2R_2$, the resistance $$\frac{2Rp}{1+\mu_2}$$

and the resistance of the series arms of the equivalent T network of the transformer $T_1$, $$\left(k \text{ being } \frac{\mu_1-1}{\mu_2+1}\right)$$

In the case of this equivalent network of the converter of Fig. 7A, as in the case of the equivalent network (Fig. 8) of the converter of Fig. 7, all reactance elements of the network $N_2$ (including the condensers $C_1$ and $C_2$ and the inductance $L_2$) are in shunt arms of that network, so all series arms of that network have negligible reactance or in other words that network has no series arms whose reactance is not negligible. In the case of the converters of Figs. 7 and 5, the converter preferably is such that in its equivalent circuit (Fig. 6 with its transformers $T_1$ and $T_2$ considered to be replaced by their usual equivalent T networks, and Fig. 8 with its transformers $T_1$ considered to be replaced by the usual equivalent T network) the impedance of all series elements of the circuit (between terminals 1 and ideal converter C and between C and terminals 2) is much smaller than the impedance to be attached to terminals 1 and than the impedance to be attached to terminals 2, and the impedances of all shunt arms of the circuit (between C and terminals 1 and between C and terminals 2) are much greater than the impedance to be attached to terminals 1 and than the impedance to be attached to terminals 2.

Converters embraced in the invention include not only converters of push-pull form but also converters of single-sided form, as for example, the converter (not shown) obtainable by omitting from Fig. 5 the following elements on the right-hand side of the figure: $V_1$, $C_1$, $R_1$, $R_2$ and the winding between $R_2$ and ground. However, in the case of Fig. 5 the push-pull form has important advantages, including: double the power output of the single-sided circuit (assuming tubes of like type for the push-pull and the single-sided circuits); power supply noise reduction due to push-pull operation; and especially the advantages that $\mu_1$ is not dependent entirely upon the coupling factor between the two halves of the center-tapped winding of transformer $T_2$, and that the effect of the three-winding transformer $T_2$ upon the transformation ratio of the converter can much more readily be balanced out or neutralized by a push-pull (three-winding) transformer $T_1$ than by the two-winding transformer which would result from omission of the winding between $R_2$ and ground. In the push-pull form of the converter as shown in Figs. 5 and 6, over a prescribed frequency range $k$ may, for example, be made close to unity as indicated above, the sum of the impedances $2R_2$ and $$\frac{2\bar{R}p}{1+\mu_2}$$

may be made negligibly small and the admittance of the shunt path comprising condensers $C^1$ and resistances $R_1$ may be made negligibly small, as indicated above, and then the transformers $T_1$ and $T_2$ as seen from the ideal converter C may be made as nearly alike as practicable, so that each will substantially neutralize the effect of the other upon the transformation ratio of the converter.

Converters embraced in the invention include also the single-sided converter (not shown) obtainable by omitting from Fig. 7 the following elements: the right-hand tube $V_1$, the resistance $R_2$ at its cathode, the winding turns of transformer $T_1$ connected between that resistance and ground, and the elements $C_1$, $R_3$, $R_1$ and $C_2$ that couple the plate of the left-hand tube to the grid of the right-hand tube. However, in contrast to this single-sided circuit, the corresponding push-pull form shown in Figs. 7 and 8 has the important advantages, especially the advantage that the positive feedback coupling through the coil $L_2$ is supplemented by positive feed coupling from the plate of each tube to its grid through the other tube (acting as an amplifier in the regenerative feedback path). Thus the phase angle of $\mu_1$ is not entirely dependent upon the coupling between the two halves of the winding of $L_2$ as it would be in the single-sided arrangement. Furthermore, in the single-sided arrangement there would appear in its equivalent circuit a series term between the terminals 2 and the ideal converter C which would depend in value upon the leakage inductance in $L_2$. This term would be reactive and hence introduce the possibility of singing, as explained above.

Figures 10, 11:
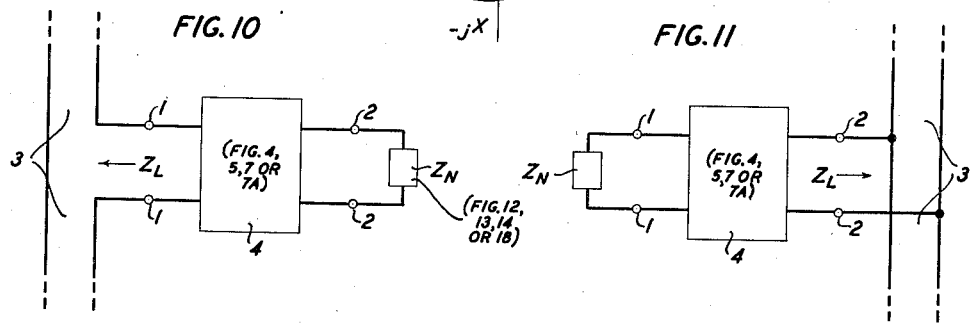
Figs. 10 and 11 show converters respectively in series and in shunt with a line.

Considering Fig. 7, for example, as having terminals 1 connected in series in a line and terminals 2 connected to a network $Z_N$ as shown in Fig. 10 described hereinafter, the converter may be viewed as a vacuum tube circuit with both negative feedback and positive feedback and with the terminals 1 serving as the input terminals and also the output terminals so the input impedance is also the output impedance. In each triode, negative feedback is produced by the impedance of the resistance $R_2$ at its cathode and the winding turns of transformer $T_1$ connected between that resistance and the negative pole of battery B. This negative feedback greatly lowers the impedance between the cathode and ground (somewhat as the feedback action in a cathode follower reduces its cathode-to-ground impedance). The lowering of the impedance between the cathode of each triode $V_1$ and ground results in lowering the converter input (and output) impedance appearing at terminals 1 as viewed from the line. This impedance is further lowered, and is made negative, by the positive feedback, which occurs in each triode due to the connection from its plate through the RC circuit to the grid of the other triode and the connection from the plate of that other triode through the like RC circuit to the grid of the first triode. In the circuit of each triode, and also in the converter or vacuum tube circuit as a whole, the total feedback preferably is negative, the negative feedback predominating over the positive feedback. The predominance of the negative feedback tends to stabilize the system against variation in vacuum tube constants and plate supply voltages.

Still considering Fig. 7, for example, as having terminals 1 connected in series in the line and terminals 2 connected to network $Z_N$ as shown in Fig. 10 described hereinafter, it will be appreciated that the amplifier triodes are arranged to generate in their plate circuits a voltage, derived from the network voltage drop, which aids or boosts the line current. This aiding voltage is thus proportional to line current and will cause an increase in current over the unrepeatered condition. Because the voltage is also proportional to the network impedance, the transmission gain or current increase will be proportional to it and can be changed up or down by adjusting the network impedance up or down correspondingly.

The voltages which produce the repeater gain are obtained by feedback connection within the amplifier circuit. Voltages appearing across the network are fed back to the grids through paths comprising the coupling condensers $C_1$ which connect the plate of each triode to the grid of the other triode. This results in a polarity or phase for the amplified network voltage which aids the current, and so this feedback is positive feedback. Voltages appearing in the cathode circuit of each tube between cathode and ground are applied to the grid in such polarity or phase that the amplified voltage appearing in the plate circuit opposes the line current. This feedback is negative feedback. The gain depends on the resultant of these two feedback voltages.

Elements in the grid circuit of each triode are used for controlling the feedback at the high and low frequencies so as to reduce the gain outside the range of frequencies for which gain and negative impedance are desired (for example, in the case of telephone repeater, the range of frequencies for normal telephone usage) and increase the stability of the repeater. Coupling condensers $C_1$ and resistances $R_1$ and $R_3$ make combinations that reduce the positive feedback from the network at the low frequencies. Condensers $C_2$ and resistances $R_3$ and $R_1$ make combinations that reduce the same feedback at the high end of the desired frequency band. As noted above, the network $C_1$, $R_3$ and $R_1$ largely determines the value of $\mu_1$ at low frequencies, and the network $R_3$, $R_1$ and $C_2$ largely determines the value of $\mu_1$ at high frequencies.

The network $Z_N$ supplements this frequency selective action, providing frequency selectivity in addition to that provided in the amplifier circuit. This serves to limit the gain to the transmission band of the particular circuit with which the network is designed or adjusted to be used, and thus serves to increase stability of the repeater (against singing). As explained hereinafter, the network further provides not only for adjusting the gain to any desired value within the allowable gain limits of the repeater, but also for equalizing or shaping the gain characteristic to compensate for the loss-frequency characteristics of the lines associated with the repeater, particularly in the case of non-loaded lines.

With terminals 1 in series in the line and terminals 2 connected to the impedance control network (gain control network) $Z_N$, the repeater can be monitored and tube checks made without interfering with the conversation on the line. To facilitate such tests, preferably pin jacks $J_1$, $J_2$ and $J_3$ are provided, $J_1$ and $J_2$ being respectively connected to the cathodes of the two triodes $V_1$ in Fig. 7, and $J_3$ being connected to ground (i. e., to the mid-point of the circuit connecting the cathodes). These jacks are used for voltmeter connection in checking the cathode-to-ground direct-current voltages of the two triode sections of the tube. These voltage tests indicate whether the tube is operating satisfactorily and whether proper voltages are being supplied. Jacks $J_1$ and $J_2$ are used also for connecting from either $J_1$ or $J_2$ to ground ($J_3$) a high impedance monitoring telephone headset (about 75,000 ohms) especially designed for the repeater. When so connected, the headset is effectively across the winding of (input and output) transformer $T_1$ and thus monitors both directions of transmission over the line.

An practical negative impedance converter such as that represented by Fig. 4 can be used most efficiently as a negative impedance repeater to provide gain in a transmission line either by connecting a network $Z_N$ to terminals 2 and inserting terminals 1 in series with the line, as exemplified in Fig. 10, or by connecting a network $Z_N$ to terminals 1 and shunting terminals 2 across the line, as exemplified in Fig. 11. In Figs. 10 and 11, the line is designated 3 and the converter 4. The converter of Fig. 7 or Fig. 7A has been designed specifically for the connection of a network $Z_N$ to terminals 2 and the insertion of terminals 1 in series with the line, in the manner shown in Fig. 10. This converter will then introduce a reversed voltage type (i. e., series type) of negative impedance in series with the line. Practically one-half of the primary winding of transformer $T_1$ should be inserted in one side of the line and the other half of the winding should be inserted in the other side of the line, for proper balance against longitudinal currents, (as shown in the case of winding 33 of Mathes Patent 1,779,382). The converter 4 may be, for example, as shown in Fig. 4, 5, 7 or 7A. The network $Z_N$ may be, for example, as shown in Fig. 12, 13, 14 or 18, described hereinafter.

Figure 9:
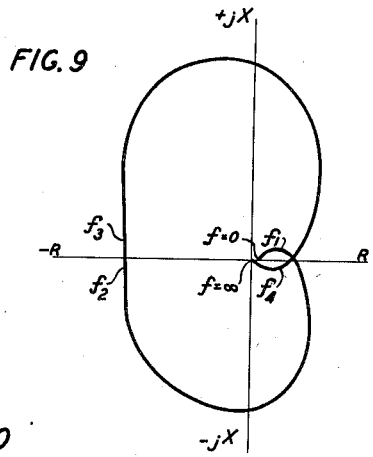
Fig. 9 shows the impedance characteristic plotted in polar form as seen at terminals 1 of Fig. 7 with a resistance connected to terminals 2.

When the converter of Fig. 7 or Fig. 7A is used with terminals 1 in series with a transmission line 3, the network $Z_N$ connected to terminals 2 in the manner shown in Fig. 10 will control the negative impedance seen at terminals 1 between frequencies such as $f_2$ and $f_3$ indicated in Fig. 9, which is the band of primary interest (and thus will control the repeater gain). The preferred network for use with the converter when the repeater is employed on voice frequency transmission lines ordinarily will not be a resistance, but will consist of some combination of resistance and capacity, or resistance, capacity and inductance.

Figures 12, 13:
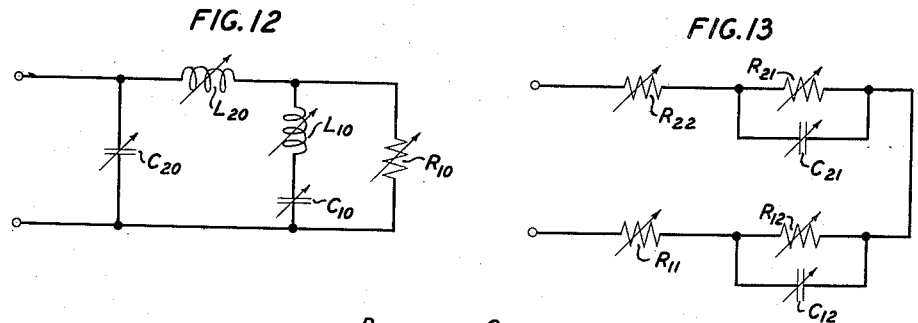
Figs. 12, 13 and 14 show networks for use with a negative impedance converter connected in series with a transmission line.
Figure 14:
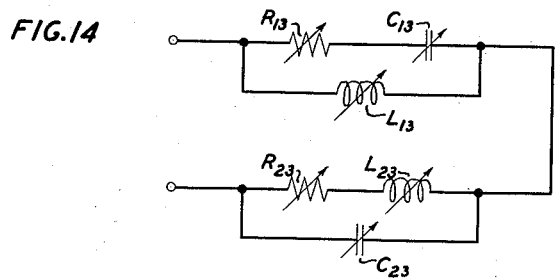

Three basic forms of such networks suitable for connection to terminals 2 of Fig. 7 or Fig. 7A are presented in Figs. 12, 13 and 14. The network configuration of Fig. 12 is suitable for use with the converter when the converter is inserted in series with a coil loaded cable circuit. When the proper values are assigned to the elements of Fig. 12 this network presents an impedance that, at frequencies between about .2 and 1.1 of the cut-off frequency $f_c$ of the periodically loaded cable, simulates the characteristic impedance of the inductively loaded cable circuit terminated at any point in the loading section. This network is disclosed and claimed in my application, Serial No. 113,073, filed of even date herewith, for "Electrical Network." From $.2f_c$ to $.9f_c$ the network impedance closely simulates that of the line, and above $.9f_c$ the ratio of the resistive component of the network impedance to that of the line impedance is maintained sufficiently low to avoid instability. The basic section of the network comprises resistance $R_{10}$ shunted by a series combination of inductance $L_{10}$ and capacitance $C_{10}$, and simulates approximately the characteristic impedance, as viewed at .2 loading coil, of the periodically loaded transmission line. The network is built out to full coil by adding inductance $L_{20}$ in series with the basic section. A building-out capacitance $C_{20}$ across the network terminals builds out the network to any fractional sectional termination desired. The component elements of the network are evaluated in terms of the inductance of the loading coil and the capacitance and characteristic impedance of the line, and may be adjustable for use with different line facilities or end sections.

The networks of Figs. 13 and 14, when the elements of these networks are assigned appropriate values, present impedances that, when converted into their negatives and multiplied by an appropriate numeric, are suitable for insertion in a non-loaded line. (As will become apparent further on, they are not designed to simulate characteristic impedances of the associated lines.) Fig. 13 is useful in a negative impedance repeater for a non-loaded line when the line section on one side of the repeater differs in type or length from the line section on the other side. Elements $R_{22}$, $R_{21}$ and $C_{21}$ are proportioned for one of the line sections, and elements $R_{11}$, $R_{12}$ and $C_{12}$ for the other line section. Fig. 14 is useful in a negative impedance repeater when a plurality of the repeaters are used in tandem for negative impedance loading as described hereinafter. The network of this figure comprises two parts in series. One of these parts is composed of resistance $R_{13}$ and capacitance $C_{13}$ in series, shunted by inductance $L_{13}$. The other of the two parts is composed of resistance $R_{23}$ and inductance $L_{23}$, shunted by capacitance $C_{23}$.

In many cases, especially within the area covering a city or town, known as an exchange area, a line that has already been loaded with periodically spaced series inductance coils to improve its transmission response, nevertheless can advantageously have its attenuation reduced further by the addition of a negative impedance in series in the coil loaded line. Such an addition ordinarily produces an impedance irregularity; but in many instances this irregularity is not a serious transmission impairment in coil loaded lines and its disadvantage is more than outweighed by the gain in transmission obtained by the insertion of this negative impedance. In such cases, the negative impedance inserted in the line preferably is similar in characteristic to the negative of the characteristic impedance of the coil loaded line multiplied by a numeric which depends in value upon the return loss of the line at the point of insertion. The negative impedance may be provided, for instance, by a negative impedance repeater such as that of Fig. 10, and may, for example, comprise the negative impedance converter of Fig. 7 or Fig. 7A with a network $Z_N$ of impedance value $Z_N$ such as the network of Fig. 12.

Figure 15:
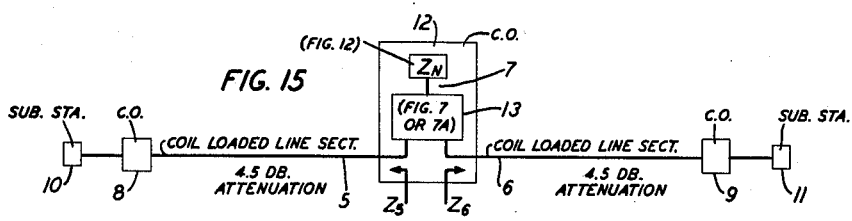
Fig. 15 shows a negative impedance repeater in series between inductively loaded line sections.

A method of thus applying the negative impedance repeater to inductively loaded lines can be explained by the example shown in Fig. 15, where it is assumed for simplicity that the two periodically coil loaded line sections 5 and 6 between which the negative impedance repeater 7 is connected are identically alike, the attenuation of each being taken by way of example, as 4.5 decibels. Their far end terminations may be, for example, at central offices 8 and 9, respectively, which comprise central office switching equipment for connecting lines 5 and 6 to other circuits, as for instance, subscriber loops including subscriber stations 10 and 11. The repeater 7 may be, for example, at a third central office in the exchange area, this office being designated 12 in the drawing. The negative impedance converter of the repeater is designated 13. As just indicated, it may be the converter shown in Fig. 7 or Fig. 7A, for instance.

Figure 16:
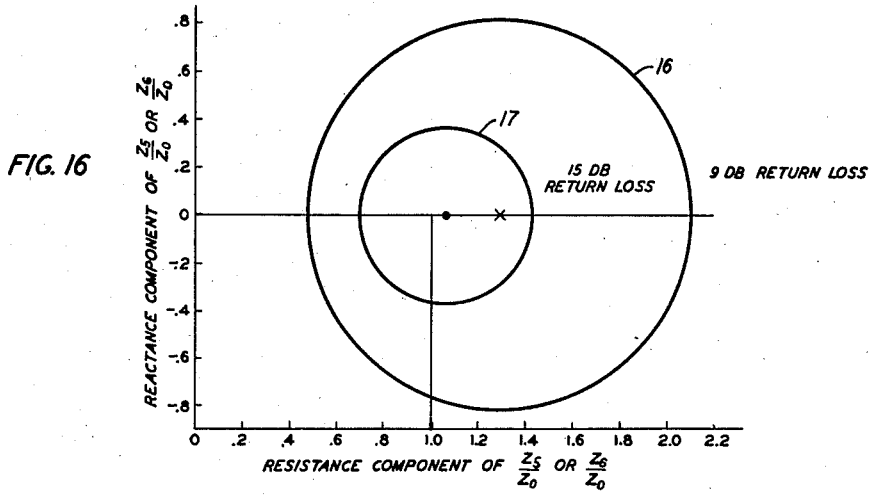
Fig. 16 shows return loss circles for facilitating explanation of Fig. 15.

If line section 5 be either open-circuited at 9 or short-circuited at 8, then as the frequency in the pass band of the line is varied the impedance $Z_5$ seen at the repeater point (if plotted on the resistance-reactance plane) will oscillate or follow a circle which encloses the characteristic impedance $Z_0$. For coil loaded exchange circuits this impedance $Z_5$ will go around the circle approximately once for every loading point in line section as $Z_5$ is investigated over the pass band of frequencies. If the line section contains no structural or other impedance irregularities, then when the line is open-circuited or short-circuited at 8 the return loss $$[20 \log_{10} (1+Z_5/Z_0)/(1-Z_5/Z_0)]$$

expressed in decibels equals twice the line section attenuation, or 9 decibels in the example of Fig. 15. In Fig. 16 a circle 16 is shown plotted on the normalized impedance plane, i. e., a resistance-reactance plane whereon the abscissae are resistive or real components of the ratio $Z_5/Z_0$, and the ordinates are reactive components of the ratio. On this plane the point $1 \pm j0$ equals the characteristic impedance $Z_0$ of any line. The circle 16 is the locus of all possible values of $Z_5/Z_0$ that will give a 9-decibel return loss. As shown in Fig. 16, for this 9-decibel return loss circle $$\frac{Z_5}{Z_0}$$

will be a minimum at 0.477, or in other words, $Z_5$ will be a minimum at $0.477Z_0$. The impedance $Z_5$ will be a maximum at $2.09Z_0$. Thus for any given return loss (RL) the impedance $Z_5$ will have one minimum and one maximum value.

Let $-h$ designate the factor by which the impedance $Z_N$ of network $Z_N$ must be multiplied in order to obtain the value of the negative impedance presented to the line by the repeater (at terminals 1 of Fig. 7 or 7A, for example).

For stability, the negative impedance of the repeater $(-hZ_N)$ cannot exceed $-0.477Z_0 \times 2$ if the line is to be either short-circuited or open-circuited at both ends 8 and 9, the two line sections having been assumed to be identical. The negative impedance $(-hZ_N)$ has manufacturing variations. These amount to about 10 per cent so that the allowable negative impedance must be reduced by 10 per cent. Hence $-hZ_N$ cannot exceed $0.429Z_0 \times 2$ or $0.858Z_0$.

If, in the talking connection, the return loss at 8 of the subscriber loop including station 10, and the return loss at 9 of the subscriber loop including station 11, each be assumed to be 6 decibels, for example, then both $Z_5$ and $Z_6$ follow the 15-decibel return loss circle 17 shown in Fig. 16 when the line is connected for subscriber use.

The variation in the insertion gain characteristic over the band of frequencies transmitted can be computed as follows. From the 15-decibel return loss circle it can be seen that the minimum value of impedance which $Z_5$ can have during the talking condition of the circuit is $0.696Z_0$ and the maximum value is $1.43Z_0$. If the negative impedance $(-hZ_N)$ of $-0.858Z_0$ is inserted in this circuit the maximum and the minimum value of insertion gain can be found by substitution in the following equation:

$$\text{Gain in decibels} = 20 \log_{10} \left| \frac{1}{1 - \frac{hZ_N}{Z_5 + Z_6}} \right|$$

The maximum value is 8.3 decibels and the minimum value 3.1 decibels. The effective insertion gain, therefore, lies between 8.3 and 3.1 decibels. Thus the line loss of 9 decibels has been reduced by about 5 decibels.

In general, when the repeater is inserted in a coil loaded line having negligible structural or other irregularities the line loss can be reduced to about one-half its non-repeatered value by the repeater gain. For terminal repeaters this reduction is slightly less than one-half. For intermediate repeaters it may be slightly more, as has just been shown.

It is noted that the negative impedance repeater introduces appreciable variation in transmission frequency response. Repeaters of the 22-type, in common use, likewise introduce such variation (though the fact is perhaps not generally appreciated).

Figure 17:
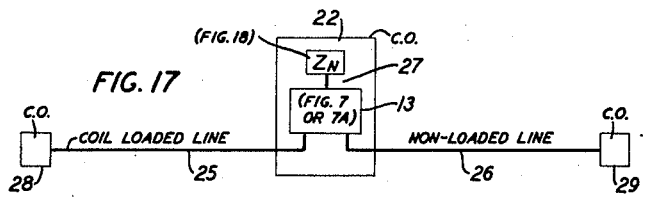
Fig. 17 shows a negative impedance repeater in series between an inductively loaded line and a non-loaded line.

Fig. 17 shows a negative impedance repeater 27 connecting in series a coil loaded line 25 and a non-loaded line 26. The repeater 27 may be at a central office 22. The lines 25 and 26 may connect central offices 28 and 29, for example, which may comprise switching equipment (not shown) for connecting lines 25 and 26 to other circuits, as for instance, subscriber loops (not shown). The central offices 22, 28 and 29 may be all in the same exchange area. In many cases, especially within an exchange area, a circuit comprising a coil loaded line (such as 25) and a non-loaded line (such as 26) in tandem can advantageously have the attenuation of the circuit reduced by connection of a negative impedance (such as 27) in series between the lines, as in Fig. 17 for example. In Fig. 17 the negative impedance repeater 27 may be, for instance, of the type shown in Fig. 10, and may, for example, comprise a negative impedance converter 13 of the type shown in Fig. 7 or Fig. 7A, with a network $Z_N$ such as the network shown in Fig. 18.

Figure 18:
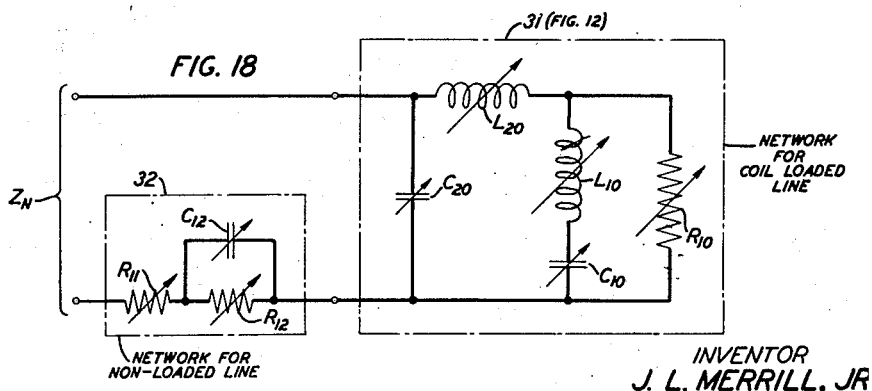

The network $Z_N$ in Fig. 18 comprises two networks 31 and 32 in series. The network 31 is shown as the network of Fig. 12 and is determined by the return loss of the loaded line 25. The network 32 is determined by the line constants per unit length and the length of the non-loaded line 26. This network 32 may be, for example, the network shown in Fig. 13 as composed of elements $R_{11}$, $R_{12}$ and $C_{12}$.

*Negative impedance loading*

Negative impedance can be inserted in a uniform transmission line to lower the line attenuation without producing an irregularity that can be seen at the line terminals, and such procedure may be called negative impedance loading. In such procedure, negative impedances can be inserted in series in the line, these tandem operated negative impedances being periodically spaced, their distance apart as a practical matter being not greater than a half wavelength at the highest frequency desired in the pass band of the line when loaded with these negative impedances. (This frequency is determined by the propagation constant of the line when loaded with the negative impedances, as distinguished from the propagation constant of the non-loaded line.) The theory of negative impedance loading also applies to a single negative impedance in series in a uniform line section approximately at the center of the section, when the distance from this impedance to either end does not exceed a quarter of the just-mentioned wavelength. Negative impedance loading is similar to coil loading in some respects but differs markedly in others. Coil loading reduces the attenuation of a line and makes the attenuation relatively uniform over the free transmission or pass band of frequencies. It changes the line impedance so that at mid-section the characteristic impedance in the pass band is larger than the impedance of the non-loaded line. Coil spacings commonly found in the telephone plant are 3000, 4500, 6000 and 9000 feet. The velocity of propagation of the voice frequency waves traveling over the line is materially decreased by coil loading. Negative impedance loading also reduces the attenuation and changes the line impedance. However, a line loaded with negative impedance may have a mid-section characteristic impedance less than the characteristic impedance of the non-loaded facility. Furthermore, negative impedance loading does not necessarily decrease the velocity of propagation of the cable; and (as is apparent from R. K. Bullington Patent 2,360,932, April 25, 1942, for Negative Resistance Loading), this means, in effect, that the maximum distance between loading points can be much greater with negative impedance loading than with coil loading, for the same cut-off frequency.

Figure 19:
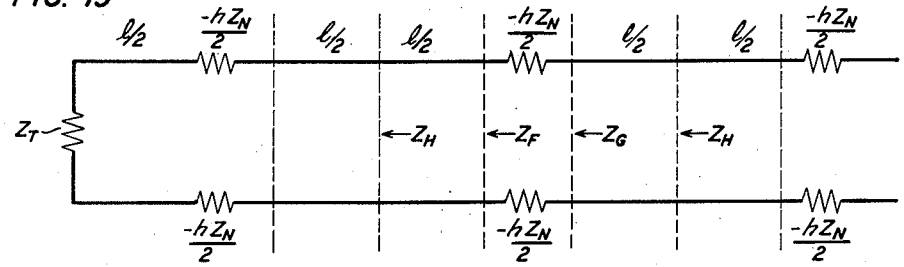
Fig. 19 shows an impedance network for use in the repeater in Fig. 17.
Figure 20:
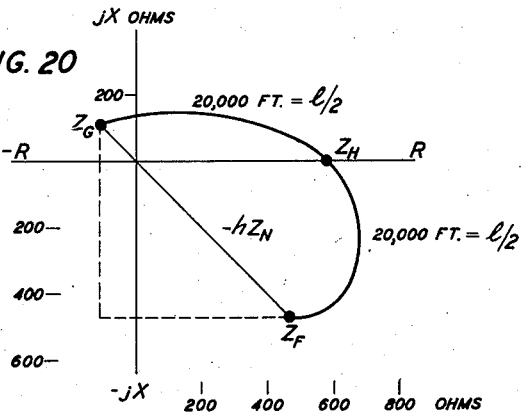

With negative impedance loading the mid-section characteristic impedance can be made to be a pure resistance in the pass band of frequencies. This is demonstrated in Figs. 19 and 20. Fig. 19 shows schematically a line loaded with negative impedance which will be designated as $-hZ_N$, at $l$ spacing. This negative impedance is inserted in a balanced arrangement one-half of $-hZ_N$ in each side of the line. The line termination is designated $Z_T$; the mid-section impedance $Z_H$; the full section impedance $Z_F$; and the zero section impedance $Z_G$. Fig. 20 presents the relationship of impedance versus distance along a loading section of a perfectly terminated line made up of 22BSA cable loaded with $-hZ_N$ every 40,000 feet for a characteristic mid-section impedance of 600 ohms. Fig. 20 shows the impedance locus for a single frequency, 1000 cycles per second. At other frequencies the locus is similar, $Z_H$ being a pure resistance in the pass band of frequencies. (For the particular length and type of line, and the particular frequency, of the example represented by Fig. 20, $-hZ_N$ happens to pass through the origin, as shown. This will not necessarily be the case for other lines or for other frequencies.) If this impedance locus of Fig. 20 as plotted on the resistance and reactance plane be traced clockwise from $Z_H$ (the characteristic mid-section impedance of 600 ohms), for a distance of 20,000 feet, the impedance of the transmission line at full section is found at $Z_F$. At this point, the negative impedance $-hZ_N$ is inserted. On the other side of the negative impedance is the zero section impedance $Z_G$. If the locus be followed from $Z_G$ a distance of 20,000 feet the mid-section impedance $Z_H$ of 600 ohms again is found. Thus the impedance cycle becomes completed and closed upon itself.

The insertion of this negative impedance will give appreciable gain and, in general, with the negative impedance constituted by the repeater of Fig. 10 including the converter of Fig. 7 or Fig. 7A and the network $Z_N$ of Fig. 13 or Fig. 14, for example, this gain will be greater at the higher frequencies than at the lower frequencies, so as to reduce the frequency distortion of the non-loaded cable, or in other words give some attenuation equalization.

A 600-ohm mid-section impedance was selected for the example, because 600 ohms is an impedance commonly used in the toll plant. In general, other impedances may be used in practice.

Table 1 at the end of this specification shows the negative impedance $(-R+jX)$, the attenuation in decibels, and the phase shift in degrees for loading 22 BSA cable at a spacing of 40,000 feet for 600-ohm characteristic mid-section impedance. For the purpose of comparison, the characteristic impedance, attenuation in decibels and phase shift in degrees is shown also in Table 1 for the non-loaded 22 BSA cable. If desired, using the repeater of Fig. 10 including the converter of Fig. 7 or Fig. 7A and the network $Z_N$ of Fig. 13 or Fig. 14, for example, a value of $-hZ_N$ can be selected which will produce a substantially purely resistive mid-section characteristic impedance for the line and at the same time will give substantially complete attenuation equalization over the pass band of frequencies (rather than the partial equalization shown by Table 1).

This example of negative impedance loading is stable (that is, the line will not sing) regardless of termination, provided the impedance of this termination does not have a negative resistance component.

In general, a line loaded with negative impedance must be stable for all terminations it may normally encounter in the telephone plant. In fact, it is desirable to have it stable for all positive impedance terminations. If each section of line is stable from mid-section to mid-section for all positive impedance terminations including short and open circuit then a line made up of a number of such sections properly arranged in tandem will be stable for all positive impedance terminations. All sections should have the same characteristic impedance where they are joined together at mid-section in order to reduce reflection losses; but the sections need not be of the same length, nor of the same line facility (as defined by the characteristic impedance and propagation constant of the non-loaded line), nor of the same attenuation when loaded and, regardless of whether they are, it will be true that if each section is stable in itself as just mentioned, then the entire line will be stable.

Stability in negative impedance loading

The following discussion of stability relates to stability of uniform lines without coil loading but loaded with negative impedance, where each section of line will be completely stable in itself for all positive impedance terminations. In this discussion it will be assumed that the negative impedance is located in the center of a section of line and that the line terminations are equal. This is not a necessary assumption, but it simplifies the explanation. Furthermore, the solution for this special case is of such a form that the rigorous solution based on more general assumptions is evident.

The negative impedance converter is to be connected in series with the line. That is, terminals 1 are connected in series with the line and terminals 2 are connected to a network $Z_N$, in the general manner indicated in Fig. 10. Let the impedance of the line as seen at terminals 1 equal $Z_L$. The converter will be stable provided that the locus of the ratio $hZ_N/Z_L$, when plotted on the resistance-reactance plane over the frequency range from zero to infinity, does not enclose the point 1/0, and unconditionally stable if whenever the angle of this ratio is zero the magnitude of the ratio is less than unity. If both line sections connected in series with terminals 1 are identical then from well-known transmission line equations the impedance $Z_L$ can be expressed by $$Z_L = 2Z_0 \left[\frac{\frac{Z_T}{Z_0} + \tanh \gamma l/2}{1 + \frac{Z_T}{Z_0} \tanh \gamma l/2}\right] \quad (1)$$

where:

$Z_0$ = the characteristic impedance of the line,
$l/2$ = the length of line to the termination in each direction,
$Z_T$ = the impedance of the termination, and
$\gamma$ = the propagation constant per unit length of the line.

If $\tanh x$ is substituted for $Z_T/Z_0$ in Equation 1 then this equation can be written in the following form:

$$Z_L = 2Z_0 \tanh (\gamma l/2 + x) \quad (2)$$

where $$x = \tanh^{-1} Z_T/Z_0$$

If $Z_T$ is allowed to vary from zero to infinity along the $+jX$ axis of the resistance and reactance plane and back from infinity to zero along the $-jX$ axis then from the theory of impedance transformation the locus of $2Z_0 \tanh (\gamma l/2 + x)$ will follow a circle. This means that the impedance $Z_L$ when plotted on the resistance and reactance plane must fall on or inside a circle for all positive values of the terminating impedance $Z_T$, i. e., for all values of $Z_T$ for which the resistive component of $Z_T$ is not negative. This circle is given by Equation 2 if $Z_T$ equals a pure reactance varying from zero to plus infinity and back from minus infinity to zero.

Thus the system comprising the negative impedance converter will be stable provided that the locus of the ratio $hZ_N/2Z_0 \tanh (\gamma l/2 + x)$, over the frequency range from zero to infinity, does not enclose the point 1/0. The circuit will be unconditionally stable provided that the magnitude of this ratio is always less than unity whenever the angle of the ratio is zero. In other words, the system will be stable provided that at no frequency does $hZ_N/2$ fall on or within the corresponding circle $Z_0 \tanh (\gamma l/2 + x)$, when $x = \tanh^{-1} \pm X/Z_0$ and that, further, the locus of $hZ_N/2$ over the frequency range does not enclose the family of circles. A stability circle is shown for a single frequency in Fig. 21 and a family of three such circles is shown in Fig. 22.

The area of the circle for any given length of line $l/2$ will change with frequency because $\gamma$ and $Z_0$ are functions of frequency. Furthermore, the greater the length of line and the greater the attenuation per unit length the smaller this circle will become.

Figure 21:
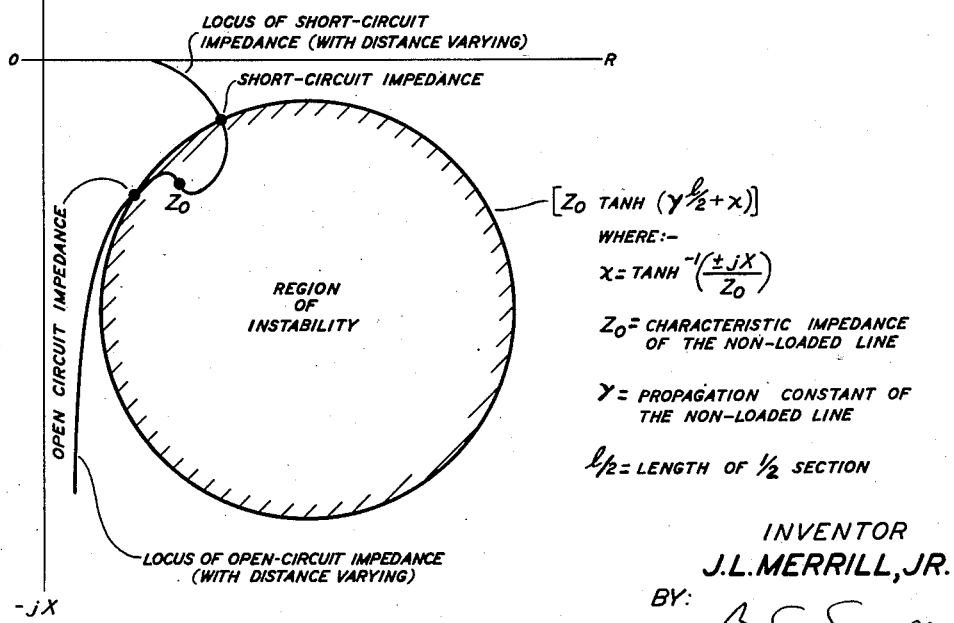
Fig. 21 shows the single-frequency impedance map for stability in a non-loaded line.

Fig. 21, besides presenting the single frequency impedance map or locus of $Z_0 \tanh (\gamma l/2 + x)$ for a cable or line where $x = \tanh^{-1} \pm jX/Z_0$, also shows the open and short-circuit loci of the line impedance $Z_L$ where the parameter of movement along the curve is distance (i. e., length of line). The impedance at the point marked $Z_0$ is the impedance for an infinite length of line. The loci of the open-circuit and short-circuit impedances meet at the point $Z_0$, at which each of these two impedances is equal to the characteristic impedance $Z_0$ of the line (since the open-circuit or short-circuit impedance of an infinite length of line is equal to the characteristic impedance of the line).

Fig. 22 shows stability circles for 20,000 feet of 22BSANL cable at frequencies of 1000, 2000 and 3000 cycles per second. The loci of the short-circuit and open-circuit impedances as they vary with frequency are also shown. If a negative impedance $-hZ_N$ is to be inserted between two sections of 20,000 feet each of 22 BSANL cable then for stability $-hZ_N/2$ must lie outside these circles. The Table 1 (at the end of this specification) gives a negative impedance for such loading. It will be observed by comparing one-half the negative impedance $(-R+jX)$ given in Table 1 for 1000, 2000 and 3000 cycles per second with the circles on Fig. 22 that the system of Table 1 will be stable.

For negative impedance loading systems such as the system of Fig. 19, the network shown in Fig. 14, with appropriate values assigned to its elements, will have an impedance characteristic suitable for ZN used with the converter of Fig. 7 or 7A in the repeater of Fig. 10.

Equations for negative impedance loading

Some equations applicable to negative impedance loading are given by Bullington's above-mentioned patent. However, these equations do not show the relationship that the propagation constants of the line before and after loading bear to the characteristic impedances of the line before and after loading. This relationship is given in Equation 3 below. Given below are also several other equations which have been found useful in the design of negative impedance loading systems, and which will be used hereinafter to determine the limitations of such systems.

From the transmission line equation the following can be derived:

$$\tanh \rho l/2 = \frac{Z_H}{Z_0} \tanh \gamma l/2 \qquad (3)$$

and $$hZ_N = -2Z_0\left[\frac{(Z_0^2-Z_H^2)\tanh \gamma l/2}{Z_0^2-Z_H^2(\tanh \gamma l/2)^2}\right] \qquad (4)$$

where $hZ_N$ = the impedance inserted in series with a line at $l$ spacing. It can lie in any one of the four quadrants of the impedance plane. The factor $h$ can be either negative or positive. The sign is included in $h$.

$Z_0$ = the characteristic impedance of the line before it is loaded with $hZ_N$.

$Z_H$ = the mid-section characteristic impedance of the line loaded with $hZ_N$.

$\gamma$ = the propagation constant per unit length of the line before it is loaded.

$\rho$ = the propagation constant per unit length of the line after it is loaded.

$l$ = the distance between loading points.

If $Z_0/(\tanh \gamma l/2)$, which is the open-circuit impedance of one-half section of the non-loaded line, is set equal to $Z_{oc}$ in the Equations 3 and 4, they can be rewritten as follows:

$$\tanh \rho l/2 = \frac{Z_H}{Z_{oc}} \qquad (5)$$

and $$\frac{hZ_N}{2Z_0} = \tanh(\gamma l/2 - M) \qquad (6)$$

where $$M = \tanh^{-1}\frac{Z_H^2}{Z_0 Z_{oc}}$$

$Z_{oc}$ = the open-circuit impedance for a length $l/2$ of the non-loaded line.

For actual computation of $\rho$ and $hZ_N$ Equations 5 and 6 can be written in the following form:

$$\rho l \text{ (decibels and degrees)} = 20 \log_{10}\left[\frac{Z_H + Z_{oc}}{Z_{oc} - Z_H}\right] \qquad (7)$$

and $$hZ_N = -2Z_{oc}\left[\frac{Z_0^2-Z_H^2}{Z_{oc}^2-Z_H^2}\right] \qquad (8)$$

Equation 9 below, follows from Equation 8 and is especially useful in determining $Z_H$ when $hZ_N/2$ is known together with the short and open-circuit impedances ($Z_{sc}$ and $Z_{oc}$, respectively) of a length non-loaded line $l/2$. It is:

$$Z_H = Z_{oc}\sqrt{\frac{Z_{sc}+hZ_N/2}{Z_{oc}+hZ_N/2}} \qquad (9)$$

From Equation 3, which is a basic equation, it can be seen that if the angle of $Z_H$ is adjusted to a value which will make the angle of the ratio $Z_H/Z_{oc}$ come out to be 90 degrees the loaded line will have zero attenuation. Furthermore, if the magnitude of $Z_H/Z_{oc}$ is zero or infinity the line attenuation is zero. In fact, the value of the mid-section characteristic impedance of a loaded line together with the constants of the non-loaded facility determine the propagation constant of that loaded line. The choice of a mid-section characteristic impedance automatically fixes the propagation constant and at the same time determines the value of the loading impedance.

Negative impedance loading for stable circuits of minimum attenuation

Theoretically, cable circuits of zero attenuation can be had with negative impedance loading and such circuits will be stable for all positive impedance terminations. However, such circuits are not practical because their characteristic mid-section impedance (at least for lumped loading where the distance between loading points is appreciable) will turn out to be either very low (zero) or very high (infinity). Nevertheless, practical loading systems can be had with very low attenuation and yet be stable for all positive impedance terminations. The equations given below define the limitations of such circuits.

In the section on Stability in Negative Impedance Loading it was stated that a loaded circuit will be stable provided the ratio $hZ_N/2Z_0 \tanh[(\gamma l/2)+x]$ over the frequency range from zero to infinity does not enclose the point $$1\underline{/0}$$

Practically, the circuit will be stable if whenever the angle of this ratio is zero its magnitude is always less than unit. The circuit will sing when this ratio equals $$1\underline{/0}$$

One equation for oscillation is therefore:

$$\frac{hZ_N}{2Z_0 \tanh[(\gamma l/2)+x]} = 1\underline{/0} \qquad (10)$$

where, as before, $$x = \tanh^{-1}(\pm jX/Z_0)$$

Substituting for $hZ_N$ from Equation 8 and omitting the negative sign, because in Equation 8 $h$ had been assumed either positive or negative but here it is assumed negative, the following is obtained:

$$\frac{Z_{oc}\left[\frac{Z_0{}^2-Z_H{}^2}{Z_{oc}{}^2-Z_H{}^2}\right]}{Z_0 \tanh\,[(\gamma l/2)+x]}=1\underline{/0} \qquad (11)$$

Substituting for $\tanh\,[(\gamma l/2)+x]$ its equivalent $$\frac{Z_{oc}\left[\frac{Z_0{}^2-Z_H{}^2}{Z_{oc}{}^2-Z_H{}^2}\right]}{Z_0\left[\frac{(\pm jX/Z_0)+\tanh\,(\gamma l/2)}{1+(\pm jX/Z_0)\tanh\,(\gamma l/2)}\right]}=1\underline{/0} \qquad (12)$$

Because $Z_0 \tanh\,(\gamma l/2)$ is the short-circuit impedance ($Z_{sc}$) of length of cable $l/2$ and because $Z_0/\tanh\,(\gamma l/2)$ is the open-circuit impedance $Z_{oc}$ of length of cable $l/2$ the Equation 12 can be written $$\frac{\frac{Z_0{}^2-Z_H{}^2}{Z_{oc}{}^2-Z_H{}^2}}{\frac{\pm jX+Z_{sc}}{\pm jX+Z_{oc}}}=1\underline{/0} \qquad (13)$$

Clearing Equation 13 the result is $$\frac{Z_{sc}[Z_{oc}(\pm jX)+Z_H{}^2]}{Z_{oc}[Z_{oc}(\pm jX)+Z_H{}^2]}=1\underline{/0} \qquad (14)$$

Thus Equation 14 cannot be fulfilled unless either $+jXZ_{oc}+Z_H{}^2$ or $-jXZ_{oc}+Z_H{}^2$ equals zero. This can equal zero only if $Z_H{}^2/Z_{oc}$ has an angle of 90 degrees because $jX$ is a pure reactance. Otherwise, Equation 14 becomes $$Z_{sc}/Z_{oc}=1\underline{/0}$$

which is an impossibility because as $Z_{sc}/Z_{oc}$ varies with frequency or with length of cable, its locus goes around $$1\underline{/0}$$

but approaches it only as a limit. Besides $Z_{sc}/Z_{oc}$ is independent of the value of $hZ_N$ and by itself cannot be related to instability. Therefore, Equation 14 can be fulfilled only if $Z_H$ has an angle such that $Z_H{}^2/Z_{oc}$ equals 90 degrees. The open-circuit impedance $Z_{oc}$ of length of cable $l/2$, where $l$ is the distance between loading points, depends upon the constants of the non-loaded cable, the length of cable $l/2$ and the frequency. The mid-section characteristic impedance of the cable $Z_H$ when loaded with $hZ_N$ at $l$ spacing depends upon the value of $hZ_N$, the constants of the non-loaded cable, its length and the frequency.

While it has been demonstrated that as long as $Z_H$ has a value such that the angle of $Z_H{}^2/Z_{oc}$ does not equal 90 degrees, the quantity $$hZ_N/2Z_0 \tanh\,[(\gamma l/2)+x]$$

cannot equal $$1\underline{/0}$$

for any combination of positive impedance terminations of the line loaded with $hZ_N$, it remains to be shown that as long as the magnitude of $Z_H$ lies between zero and infinity and the angle of it is such that $Z_H{}^2/Z_{oc}$ is less than 90 degrees at all frequencies the lines will be unconditionally stable for all positive impedance terminations and $hZ_N/2Z_0 \tanh\,[(\gamma l/2)+x]$ will not enclose the point $$1\underline{/0}$$

First, it should be noted that over the range of frequencies from zero to infinity $$hZ_N/2Z_0[(\gamma l/2)+x]$$

traces a Nyquist diagram. This can be seen if the ideal converter (Fig. 1) is considered and it is realized that $kZ_N/Z_L$ is the feedback factor ($\mu\beta$ as defined in the text book by H. W. Bode entitled Network Analysis and Feedback Amplifier Design). In the case of any practical converter (Fig. 4), if the effects of $N_1$ and $N_2$ are included in $h$ then $$hZ_N/2Z_0[(\gamma l/2)+x]$$

will trace a Nyquist diagram. If $Z_H=Z_0$ then from Equation 8 it is seen that $hZ_N$ must equal zero (that is, the line is non-loaded and stable). If the loading impedance is made negative and finite so as to reduce the magnitude $|Z_H|$ from $|Z_0|$ toward zero as a limit, the angle of $Z_H$ being kept the same as that of $Z_0$ then the attenuation will approach zero (as can be seen from Equation 3). Likewise, the attenuation of the line would approach zero if the loading impedance were varied so as to increase the magnitude of $|Z_H|$ toward infinity keeping the angle of $Z_H$ equal to that of $Z_0$. The Nyquist diagram of $hZ_N/2Z_0 \tanh\,[(\gamma l/2)+x]$ in neither case would expand so as to pass through $$1\underline{/0}$$

because at no frequency would $Z_H{}^2/Z_{oc}$ have an angle of 90 degrees or in other words Equation 14 could not be fulfilled. This is evident because the angle of $Z_0{}^2/Z_{oc}$ would be the angle of $Z_{sc}$ which does not equal 90 degrees. Thus the attenuation of the circuit can be made to approach zero as a limit and be unconditionally stable. Furthermore, if the loading impedance $hZ_N$ is made such that the angle of $Z_H$ changes from the angle of $Z_0$ so that the angle of $Z_H/Z_{oc}$ approaches 90 degrees the attenuation of the loaded line will approach zero (Equation 7) regardless of the magnitude of $|Z_H|$. The Nyquist diagram of $hZ_N/2Z_0 \tanh\,[(\gamma l2)+x]$ would expand but would not expand through the point $$1\underline{/0}$$

until the angle of $Z_H{}^2/Z_{oc}$ passes through 90 degrees. Hence, the value of the mid-section characteristic impedance $Z_H$ of a line loaded with negative impedance is a criterion of stability.

Therefore, for lines loaded with negative impedance to have minimum attenuation and for each section of line to be stable for all positive impedance terminations the angle of $Z_H/Z_{oc}$ should be as close to 90 degrees as possible consistent with the requirement that $Z_H{}^2/Z_{oc}$ must be less than 90 degrees at all frequencies. In addition, the magnitude of $Z_H$ should be as large or as small as possible with relation to $Z_{oc}$ considering that $Z_H$ must be a practical impedance and fit into the telephone system.

Below is Table 1 (referred to above in connection with Figs. 19 to 22).

Table 1.—Negative Impedance Loading System for 40,000-Foot Section of 22BSA with 600-Ohm Mid-Section Impedance

| Frequency, C. P. S. | Characteristic Impedance of Midsection of Loaded Cable, Ohms | Negative Impedance, Ohms | Propagation Constant of 40,000 Ft. Length of Loaded Cable | | Characteristic Impedance of 22BSANL, Ohms | Propagation Constant of 40,000 Ft. Length of 22BSANL | |
|---|---|---|---|---|---|---|---|
| | | | Db | Degrees | | Db | Degrees |
| 300 | 600 | −1105+j471 | 0.7 | 38.0 | 748−j740 | 7.5 | 50.2 |
| 500 | 600 | −908+j605 | 1.6 | 58.9 | 581−j571 | 9.7 | 65.0 |
| 1,000 | 600 | −615+j611 | 3.5 | 88.6 | 414−j401 | 13.6 | 92.5 |
| 2,000 | 600 | −483+j453 | 5.1 | 125.8 | 297−j279 | 19.0 | 132 |
| 3,000 | 600 | −447+j365 | 5.6 | 139.0 | 246−j225 | 22.9 | 165 |

It is to be understood that the above-described arrangements are illustrative of the application of the principles of the invention. Numerous other arrangements may be devised by those skilled in the art without departing from the spirit and scope of the invention.

What is claimed is:

1. In combination, an electric space discharge device system comprising a pair of triodes for push-pull operation each having an anode, a cathode and a discharge control grid, a first circuit connecting said cathodes including a first inductance coil, a second circuit connecting said anodes including a second inductance coil, a path interconnecting a point of said first circuit between the two halves of said first coil and a point of said second circuit between the two halves of said second coil, a third circuit connecting said grids including an impedance having its mid-point connected to said path, a pair of feedback paths, one of said feedback paths connecting the grid of one of said triodes to a point of said second circuit between said second coil and the anode of the other triode, and the other of said feedback paths connecting the grid of the latter triode to a point of said second circuit between said second coil and the other anode, a line having one of said coils inductively coupled in series therein, and an impedance coupled to the other coil for controlling the impedance of said system as seen from said line.

2. In combination, an electric space discharge device system comprising a pair of triodes for push-pull operation each having an anode, a cathode and a discharge control grid, a first circuit connecting said cathodes including a first inductance coil, a second circuit connecting said anodes including a second inductance coil, a path interconnecting a point of said first circuit between the two halves of said first coil and a point of said second circuit between the two halves of said second coil, a third circuit connecting said grids including an impedance having its mid-point connected to said path, a pair of feedback paths, one of said feedback paths connecting the grid of one of said triodes to a point of said second circuit between said second coil and the anode of the other triode, and the other of said feedback paths connecting the grid of the latter triode to a point of said second circuit between said second coil and the other anode, a line having one of said coils coupled in shunt thereto, and an impedance coupled to the other coil for controlling the impedance of said system as seen from said line.

3. In combination, an electric space discharge device system comprising a pair of triodes for push-pull operation each having an anode, a cathode and a discharge control grid, a first circuit connecting said cathodes including a first inductance coil, a second circuit connecting said anodes including a second inductance coil, a path interconnecting a point of said first circuit between the two halves of said first coil and a point of said second circuit between the two halves of said second coil, a third circuit connecting said grids including an impedance having its mid-point connected to said path, a pair of feedback paths, one of said feedback paths connecting the grid of one of said triodes to a point of said second circuit between said second coil and the anode of the other triode, and the other of said feedback paths connecting the grid of the latter triode to a point of said second circuit between said second coil and the other anode, a line, a two-terminal impedance device coupled to one of said coils, and coupling means for inductively coupling said other coil in series in said line, said feedback paths rendering negative the impedance of said coupling means facing said line, over a prescribed frequency range the attenuation of said line increasing with frequency and the impedance of said two-terminal impedance so varying with frequency as to cause the sum of said negative impedance and the line impedance that it faces to decrease with frequency sufficiently to produce a substantial amount of line attenuation equalization.

4. A system comprising a non-loaded telephone transmission line and an electric space discharge amplifier, said amplifier comprising a negative feedback impedance common to the cathode-anode and cathode-grid circuits and inductively coupled in series in said line, an anode circuit load impedance in serial relation with said negative feedback impedance in the anode-cathode circuit, and means for producing in the amplifier positive feedback that renders negative the amplifier input impedance facing said line, said means comprising a positive feedback path whose input voltage depends upon and is derived from said anode circuit load impedance, said anode circuit load impedance including an impedance network for at least partly equalizing attenuation of said line over a predetermined frequency range, said network comprising a resistance in series with a branched circuit having a capacitance in one branch and a resistance in another.

5. The combination with an inductively loaded line having two line sections, each inductively loaded, of a reversed voltage type negative impedance in series between the two line sections, over the operating frequency range the value of said negative impedance being equal to the negative of the characteristic impedance of the inductively loaded line times a factor which is substantially a numeric within said range and which is such that at all frequencies from zero to infinity the magnitude of said negative impedance is less than the magnitude of the total line impedance faced by said negative impedance.

6. The combination with a line having two sections, one section inductively loaded and the other non-loaded, of a reversed voltage type negative impedance in series between the two line sections, over the operating frequency range the value of said negative impedance being equal to the sum of two component negative impedances, one of said component impedances being equal to the negative of the characteristic impedance of said inductively loaded section of line times a factor which is substantially a numeric within said frequency range and which is such that at all frequencies from zero to infinity the magnitude of said one component is less than the minimum impedance of said inductively loaded section of line, at all frequencies from zero to infinity said second component impedance, when plotted on the resistance-reactance plane, lying outside the circle defined by $Z_0 \tanh(\gamma l + x)$, where $l$ is the length of the non-loaded section of line and the significance of $Z_0$, $\gamma$ and $x$ is as given in the specification above.

7. A line loaded with uniformly spaced negative impedances dividing the line into sections of the same length, the same attenuation and the same propagation velocity, over a prescribed frequency band said negative impedances rendering the mid-section characteristic impedance of the line a substantially non-reactive resistance.

8. A line according to claim 7, said resistance being constant throughout said band.

9. A line according to claim 7, said negative impedance substantially reducing the line attenuation.

10. A line loaded with uniformly spaced reversed voltage type negative impedances in series in the line dividing it into sections of the same length $l$, said loaded line having over a prescribed frequency range a mid-section characteristic impedance substantially a non-reactive resistance R, the value of each of said negative impedances being equal to $$-2Z_{oc}\left[\frac{Z_0^2 - R^2}{Z_{oc}^2 - R^2}\right]$$

where the significance of $Z_{oc}$ and $Z_0$ is as given above in the specification.

11. A line according to claim 10, R being constant, independent of frequency.

12. A line according to claim 10, R being a function of frequency.

13. A line loaded with uniformly spaced reversed voltage type negative impedances in series in the line dividing in into sections of the same length $l$, said loaded line having over a prescribed frequency range a mild-section characteristic impedance $Z_H$ whose angle has a value such as to make the angle of $Z_H/Z_{oc}$ as close to 90 degrees as possible consistent with the condition $$\frac{Z_H^2}{Z_{oc}} < 90°$$

at all frequencies, the value of each of said negative impedances being equal at each frequency of said prescribed range to $$-2Z_{oc}\left[\frac{Z_0^2 - Z_H^2}{Z_{oc}^2 - Z_H^2}\right]$$

where the significance of $Z_{oc}$ and $Z_0$ is as given above in the specification.

14. A transmission line divided into sections of unequal lengths having a negative impedance of reversed voltage type inserted in series in the middle of each section, the value of each of said negative impedances being made equal to $$-2Z_{oc}\left[\frac{Z_0^2 - Z_H^2}{Z_{oc}^2 - Z_H^2}\right]$$

over a prescribed frequency range, where $Z_H$, the characteristic impedance at the end of the section, is the same for all sections and $Z_{oc}$ and $Z_0$ are as defined in the specification.

15. A transmission line divided into sections of unequal lengths having a reversed voltage type of negative impedance inserted in series in the middle of each section, the value of said negative impedances being made equal to $$-2Z_{oc}\left[\frac{Z_0^2 - R^2}{Z_{oc}^2 - R^2}\right]$$

over a prescribed frequency range, where R, the characteristic impedance at the end of the section, is substantially a non-reactive resistance and is the same for all sections, and $Z_{oc}$ and $Z_0$ are as defined in the specification.

16. A line in accordance with claim 15, R being constant.

17. A line in accordance with claim 15, R being a function of frequency.

JOSIAH L. MERRILL, Jr.

REFERENCES CITED

The following references are of record in the file of this patent:

UNITED STATES PATENTS

| Number | Name | Date |
| --- | --- | --- |
| 2,220,770 | Mayer | Nov. 5, 1940 |
| 2,232,642 | Shaw | Feb. 18, 1941 |
| 2,285,832 | Perkins | June 9, 1942 |
| 2,360,932 | Bullington | Oct. 24, 1944 |
| 2,360,940 | Edwards | Oct. 24, 1944 |